H. ARQUINT.
SPEED RECORDER.
APPLICATION FILED NOV. 10, 1910.

1,045,660.

Patented Nov. 26, 1912.
2 SHEETS—SHEET 2.

Witnesses
H. I. Morris
Olive D. White

Inventor
Hans Arquint
By Howard Coombs
Attorney

UNITED STATES PATENT OFFICE.

HANS ARQUINT, OF ARBON, SWITZERLAND.

SPEED-RECORDER.

1,045,660.　　　Specification of Letters Patent.　　Patented Nov. 26, 1912.

Application filed November 10, 1910. Serial No. 591,693.

*To all whom it may concern:*

Be it known that I, HANS ARQUINT, a citizen of the Republic of Switzerland, residing at Arbon, Switzerland, have invented new and useful Improvements in Speed-Recorders, of which the following is a specification.

This invention relates to a recording apparatus for vehicles, such as automobiles, and pertains particularly to a device for graphically portraying upon a record-strip a record of the speeds at which the machine has traveled throughout a given period, as, for instance, a day.

Principally, the object of the invention resides in the construction of a permanent recording apparatus which is provided in such compact form, that it may be regularly carried as part of the machine's usual equipment, and may, if desired, be formed as part of the distance-recording device, to be driven or operated by the same shaft that drives said distance-recording device. By this arrangement, it is possible to construct a permanent speed record apparatus for use on the ordinary automobile in connection with the ordinary speedometer and distance-recording apparatus, the whole device not requiring more space for mounting than the ordinary apparatus now carried by automobiles.

Also, it is an object to construct a speed-recording apparatus in which the record-strip will not be the usual large graphic sheet of recording instruments, but will be merely a comparatively small and inconspicuous strip of sheet material, which takes a complete record of the day's speeds from hour to hour.

Furthermore, it is an object to provide a device which, though it employs a narrow strip of record material, will nevertheless keep a continuous record throughout the day.

Further, it is an object to construct a device of this character in which the record-drum also acts as the propelling means for the stylus or marking device.

Figure 1:
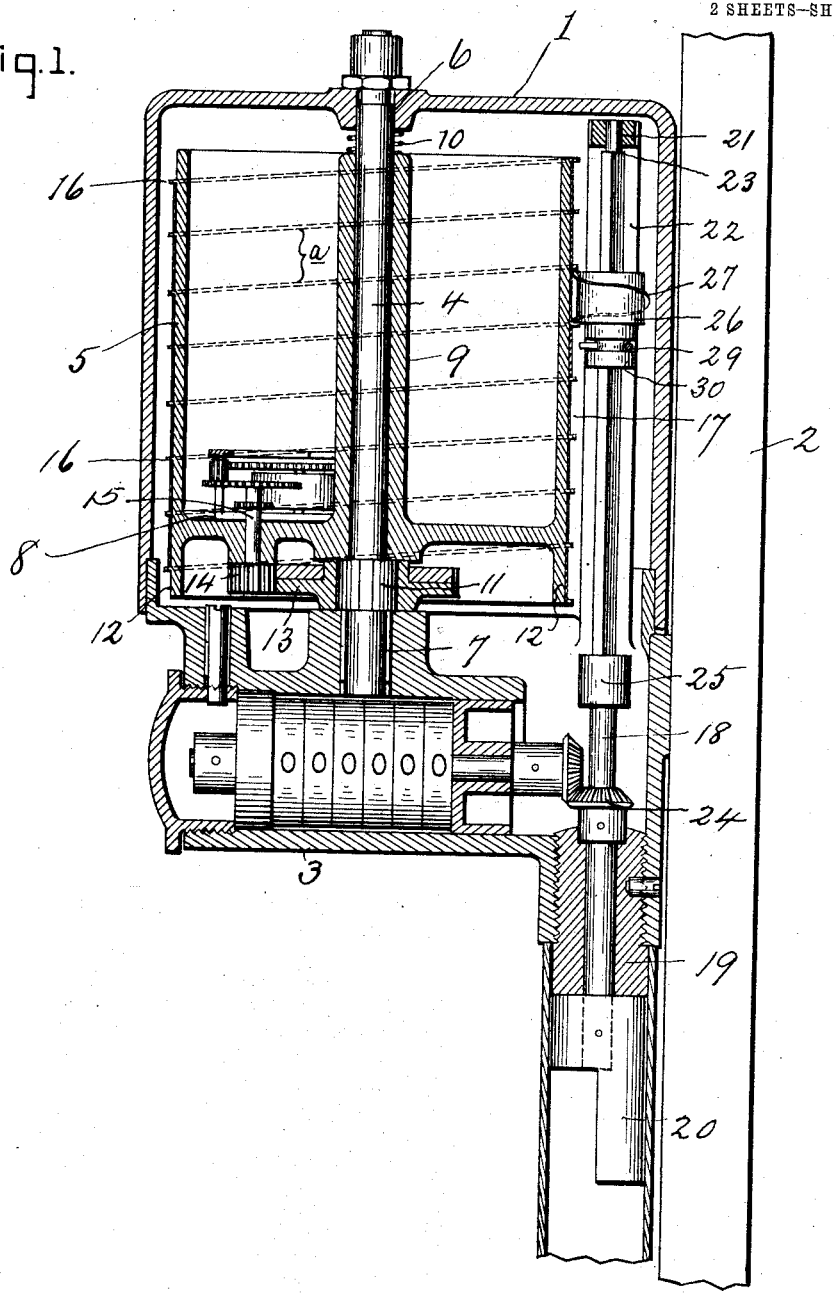
Figure 2:
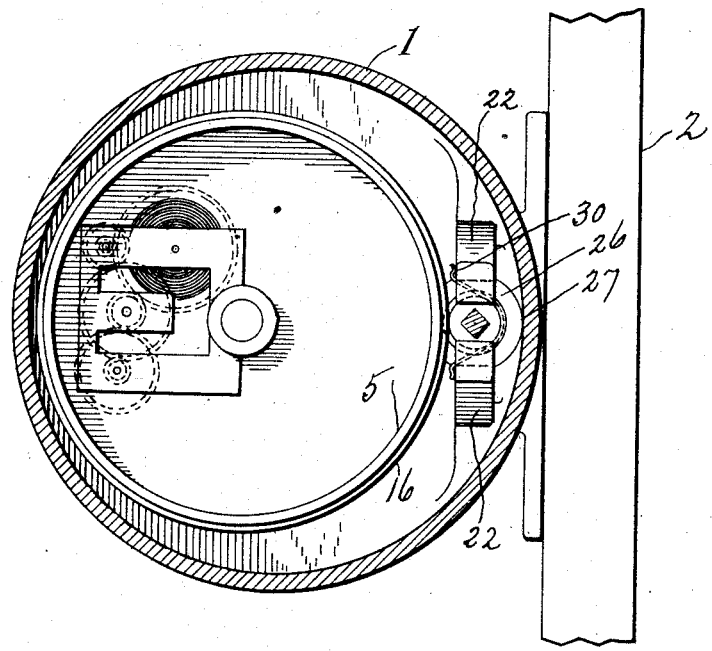
Figure 3:
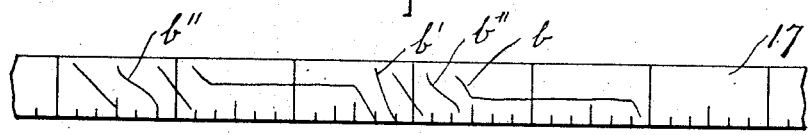

With the above and other objects in view, as will hereinafter appear, my invention will now be fully set forth and described, reference being had to the accompanying drawings, which form a part of this specification, and in which, Figure 1 is a vertical sectional view of my improved apparatus, showing the device attached to the dash-board of a motor vehicle, Fig. 2 is a horizontal sectional view of the device, taken on line 2—2 of Fig. 1, and Fig. 3 is a view of a section of the graphically marked record-strip, showing marks which will be hereinafter fully considered.

Referring more particularly to said drawings, in which like numerals of reference indicate like parts throughout, 1 is the casing of the apparatus comprising my invention, secured in any suitable manner to the dash-board 2 of the vehicle, said casing 1 forming a part of, or being mounted on the casing of a distance-recording device, such as is shown at 3. As the distance-recording device forms no part of the present invention, and any suitable similar device may be used, it is only conventionally shown. In the present construction the speed recorder casing is shown as separable from the casing of the distance-recording device, this being the preferable construction.

Mounted within the casing 1, and having a vertical bearing on the shaft 4, is the drum 5, said shaft 4 having upper and lower bearings in the casing 1 at 6 and 7. Said drum 5 consists of a hollow vessel having a membrane 8 closing its lower end, and from which rises a central tubular bearing 9, the latter being carried by the shaft 4, and maintaining the drum 5 in stable and substantially unwearing position. A coil-spring 10 surrounding the shaft 4 at its upper end, bears between the upper end of the casing and the upper end of the tubular bearing 9 to keep the drum seated upon the shoulder 11, formed on the shaft 4 adjacent its lower end, to prevent its vertical movement on said shaft.

Keyed on the shoulder 11, above mentioned, and housed by a downwardly projecting portion 12 of the drum 5, is the fixed gear-wheel 13, which meshes with a spur-wheel 14, mounted on the lower end of a revoluble shaft 15. Said shaft 15 has a lower bearing in the membrane 8, and is adapted to operate a suitable clock-work motor, (not shown), by which the drum 5 is rotated. The drum, in the present instance, is intended to be rotated once in a day or twenty-four hours. The clock-work motor is contained in the drum, and while revolving with the latter, is geared to drive the drum as above indicated.

Extending from the lower to the upper end of the drum 5, and ascending in a regular spiral, is a ridge or rib 16, said rib 16 forming a continuous seat or groove $a$ in which the record-strip 17 is spirally seated to receive the record marks from the stylus hereinafter described. Said rib 16 is or may be formed of a metal strip mounted upon the surface of the drum 5 by soldering, though it may be mounted in any other suitable way, as by being seated in a groove formed in the drum 5, in spiral form. Said rib 16 not only forms the seat $a$, above mentioned, but also acts as a propelling member for the stylus mechanism, as will appear later.

Mounted vertically and parallel to the surface of the drum 5 is a shaft 18, having its lower end extending through the bearing 19 threaded or otherwise secured in the casing 1, and connected to the clutch member 20, which in turn is adapted to be connected to a proper drive-shaft (not shown). The upper end of the shaft 18 is journaled in a bearing block 21, which is loosely seated between the upper ends of the opposing standards 22, the latter rising from the lower part of the casing 1, and preferably forming a part thereof. Said bearing-block 21 is free to move toward and from the drum 5, and rests upon a shoulder 23 formed on the shaft 18, so that in the automatic adjustment of the marking device hereinafter described, the shaft 18 will be free to be swung toward and from said drum. A bevel-gear 24 fixed on the shaft 18 provides a driving means for the distance measuring means 3 above mentioned.

Between the annular shoulder 25 carried by the shaft 18 and its upper end, the latter is squared, and mounted thereon for vertical sliding movement and rotatable therewith, is a cylindrical block 26. Said cylindrical block 26 vertically fills the space $a$ between the turns of the spiral rib 16, and has mounted thereon a spiral rib 27 which constitutes a stylus adapted to act upon the record-strip 17 in recording the speed of the machine which carries the device and rotates the shaft 18. From the above it will be evident that the rib or ridge 16 on the drum 5 will lift the block 26 in a regular movement when said drum 5 is revolved. Said rib or stylus 27 is a strip of suitable metal mounted on the surface of the block 26, and completely encircles the block once, with one of its ends at the upper end of the block, and its other end vertically below at the other end of the block, its construction being such that one point of its length will always bear on the drum 5. The above construction discloses the following facts:—First, that one revolution of the block 26 with the surface of a stationary cylinder or drum in contact with the stylus or rib 27, will cause said stylus to transcribe a vertical line upon said drum or cylinder through the successive action of points of its edge on the drum; and, second, that if the drum or cylinder is revolved, while the block and consequently the stylus is stationary, a horizontal line will be transcribed on the cylinder or drum since only one point of the edge of the stylus bears stationarily on the drum. These facts will be more fully dealt with in the description of the operation of the machine.

Located below the block 26, and preferably formed as a part of the latter, is a smaller cylindrical part 28, which is intermediately grooved, as at 29, to form a circular seat for a double leaf-spring. Said spring 30 is medially bowed to encircle said groove 30, and has its ends formed into feet which bear, with the tension of the spring, against the inside of the standards 22. By this means the block 26 is caused to bear with a constant, though resilient, pressure against the surface of the recording-strip 17.

The record-strip is a continuous length cut to lie in the spiral groove or seat $a$, and is suitably prepared to receive impressions on its exposed surface from the stylus or rib 27. Its surface is graduated into spaces corresponding to the record to be kept. The present embodiment contemplates a daily record, and therefore the strip is divided into twenty-four spaces, which are again subdivided into spaces representing parts of hours.

The above described mechanism constitutes the construction of my improved device, and its operation involves the proper occurrence of the movements above set forth. When a device of this type is put into service, a record-strip of the type above described is placed upon the drum 5 in the groove or seat $a$ and suitably retained. The clock-work above mentioned is placed in operation, to cause the drum 5 to revolve once in twenty-four hours, the period for which one successive record is desired, and the device is ready for the operation of the stylus thereon. Reference to Fig. 3 will show, in connection with this description, the graphic record which the stylus will make upon the record strip 17. If it be considered that the machine to which the device is attached be at rest, and applying the second movement hereinbefore mentioned, it will be seen that a horizontal mark will be made upon the strip by the stylus, this stylus being stationary with regard to the cylinder, notwithstanding that the block is carried upwardly as the drum revolves, since the drum is revolving at a constant rate of speed, while the spiral stylus is bearing upon the surface of said drum or strip with a single point of its edge. If, however, the drum continuing its own slow movement, which is in the nature of an invisible motion, and the block continuing its likewise imperceptible motion upwardly on the drum, the block 26 is revolved with the shaft, the spiral stylus will cease to bear with one point only on the drum 5, and will present a succession of points to the record-strip. If this succession of points is very rapidly presented, a mark very closely approaching the vertical will be made on the strip, as is evident, but if the block is revolved at more average intermediate speeds, the positions of the successive marks made by the stylus will be more or less oblique, the obliquity varying between the horizontal mark of the stylus at rest, as shown by lines $b$ and the vertical mark of the stylus at its limit of fast motion, indicated at $b'$. Further consideration of the record-strip shown in Fig. 3 will disclose the fact that the record marks are in reality a continuous record of every second of the day, since the rear end of each line left by the stylus is directly under the beginning of the next succeeding line. Furthermore, the lines are, in some instances, curved, as shown at $b''$, thus indicating to the instant the variations in speed, since the revolution of the block 26 responds in speed instantly to the changes in speed of the machine, and therefore the stylus shows instantly in the curvature of the line which it is making, the change in speed of the machine.

It will be evident from the above description, that the device embodying my invention is a compact and economically constructed instrument, and that the record-strip produced thereby gives a full and detailed record of the day's runs and speeds.

Having thus fully set forth and described my invention, what I claim and desire to secure by Letters Patent of the United States is:—

1. A speed recorder, comprising in combination, a moving record-strip-carrying means, a stylus acting on said record-strip-carrying means, means for actuating said stylus to produce records indicating various speeds, and means carried on the record-strip carrying surface of said record-strip-carrying means for moving said stylus over the latter.

2. A speed recorder, comprising in combination, a record-strip-carrying means, a stylus acting on said record-strip-carrying means, means for driving said stylus to indicate the speeds to be recorded on said strip-carrying means, and means carried on the record-strip-carrying surface of said strip-carrying-means for progressing said stylus over said surface.

3. A speed recorder, comprising in combination, a time controlled record strip-carrying means, a stylus acting on said record receiving means, means for driving said stylus to record the speeds on a strip carried by said receiving means, and means carried on the surface of said receiving means for transferring the time controlled movement of the receiving means to said stylus to record an hour to hour record.

4. A speed recorder, comprising in combination, a constantly driven record strip-carrying member, a stylus rotatable parallel to said record strip-carrying member, and movable longitudinally of said strip-carrying member, and means carried by said strip-carrying member for causing said stylus to progress along the length of the former as it makes its record thereon.

5. A speed recorder, comprising in combination, a rotary drum, means carried by said drum for retaining a record strip, a rotary stylus movable along said drum and progressed thereby in timed movement parallel to the axis of the latter, and means for rotating said stylus to produce records of various speeds on said record strip.

6. A speed recorder, comprising in combination, a time controlled rotary drum, a shaft mounted parallel to said drum and adapted to be rotated by a drive shaft, a member rotatable with said shaft and longitudinally movable thereon, means carried by said drum for moving said member on said shaft, and means carried by said member for marking a record strip carried by said drum.

7. A speed recorder, comprising in combination, a rotatable time controlled drum adapted to carry a record strip, a shaft mounted parallel to said drum and rotatable independently thereof, a member rotatable with said shaft and movable longitudinally of said drum in contact therewith, means on said drum for moving said member longitudinally, and means encircling said member in position to make a record on the record strip.

8. A speed recorder, comprising in combination, a rotatable time controlled drum adapted to carry a record-strip, a shaft mounted parallel to said drum and rotatable independently thereof, a member rotatable with said shaft and movable longitudinally of said drum in contact therewith, means on said drum for moving said member longitudinally, and a spiral member encircling said longitudinally movable member in position to make a record on the record strip.

9. A speed recorder, comprising in combination, a time controlled rotary drum, a rotary member movable longitudinally along said drum, a spiral rib encircling said drum from bottom to top, a record strip seat formed by said spiral rib, and means carried by said rotary member for marking a record strip, said spiral rib being adapted also for propelling said rotary member longitudinally along said drum.

10. A speed recorder, comprising in combination, a time controlled rotary drum, a rotatable member movable longitudinally along said drum, means for moving said member longitudinally, and means on said rotatable member for marking a record strip.

11. A speed recorder, comprising in combination, a drum carrying a record strip, a rotatable member movable longitudinally of said drum, means carried by said drum for moving said member longitudinally, and means carried by said member and adapted to make records on said record strip.

12. A speed recorder, comprising in combination, a record-strip-carrying member, a stylus-carrying member, and means carried on the record-strip-carrying surface of said record-strip-carrying member for advancing said stylus-carrying member.

13. A speed recorder, comprising in combination, a record-strip-carrying member, a rotatable stylus-carrying member, a stylus thereon, means carried by said record-strip-carrying member for actuating said stylus carrying member, and means for actuating said stylus.

14. A speed recorder, the combination with a record-strip-carrying member, and a cylindrical stylus carrying member, a spiral rib formed on said cylindrical member and encircling the latter once, and adapted to bear on said record-strip-carrying member.

15. In a speed recorder, the combination with a record-strip-carrying member having a cylindrical surface, and a stylus carrying member, a spiral rib formed on said stylus carrying member and comprising the stylus and means on said record-strip carrying member for moving said stylus carrying member.

16. In a speed recorder, the combination with a record-strip-carrying drum, a cylindrical stylus-carrying block movable along said drum, means for causing said block to be pressed against said drum, a spiral rib comprising the stylus carried by said block, and a spiral groove formed on said drum and acting on the ends of said block to cause the latter to move longitudinally along said drum.

17. A speed recorder, comprising in combination, a rotary record-strip-carrying member, a stylus-carrying member rotatable parallel to said record-strip-carrying member, said stylus-carrying member being also movable parallel to the axis of said strip-carrying member, and means mounted on the surface of said strip-carrying member to advance said stylus-carrying member along said strip-carrying member.

18. A speed recorder, comprising in combination, a rotary record-strip-carrying member, a stylus-carrying member movable parallel to the axis of said rotary strip-carrying member, and a spiral member carried on the record-strip-carrying surface of said strip-carrying member and forming a groove to receive a record strip and comprising a means for advancing said stylus-carrying member.

In testimony whereof I have hereunto set my hand in presence of two subscribing witnesses.

HANS ARQUINT.

Witnesses:
EUGENE NOBEL,
ALBERT PHILLIPS.

Copies of this patent may be obtained for five cents each, by addressing the "Commissioner of Patents, Washington, D. C."